(12) United States Patent
Chandrashekar et al.

(10) Patent No.: US 11,900,320 B2
(45) Date of Patent: Feb. 13, 2024

(54) UTILIZING MACHINE LEARNING MODELS FOR IDENTIFYING A SUBJECT OF A QUERY, A CONTEXT FOR THE SUBJECT, AND A WORKFLOW

(71) Applicant: Accenture Global Solutions Limited, Dublin (IE)

(72) Inventors: Rajashree Chandrashekar, Bengaluru (IN); Raghuram Yaddanapudi, Hyderabad (IN); Arjun Marri, Hyderabad (IN); Jayateerth Kulkarni, Bangalore (IN); Tapan Kumar Jain, Faridabad (IN); Gopali Raval Contractor, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 143 days.

(21) Appl. No.: 17/093,071

(22) Filed: Nov. 9, 2020

(65) Prior Publication Data

US 2022/0147934 A1  May 12, 2022

(51) Int. Cl.
*G06Q 10/10* (2023.01)
*G06F 9/451* (2018.01)
(Continued)

(52) U.S. Cl.
CPC ............ *G06Q 10/10* (2013.01); *G06F 9/453* (2018.02); *G06F 16/953* (2019.01); *G06F 40/40* (2020.01); *G06N 20/00* (2019.01); *G06Q 10/0635* (2013.01); *G06Q 10/06393* (2013.01); *G06Q 30/0185* (2013.01); *G06Q 30/0201* (2013.01);
(Continued)

(58) Field of Classification Search
CPC .... G06Q 10/10; G06Q 10/00; G06Q 10/0635; G06Q 10/0633; G06Q 10/06393; G06Q 30/0185; G06Q 30/0201; G06Q 40/08; G06Q 40/00; G06F 9/453; G06F 16/953; G06F 40/40; G06F 40/30; G06F 40/20; G06F 40/00; G06F 3/0482; G06N 20/00; H04L 63/08
See application file for complete search history.

(56) References Cited

U.S. PATENT DOCUMENTS 10,515,415 B1 * 12/2019 Davis .................... G06Q 40/08
2014/0006944 A1 * 1/2014 Selig ..................... G06F 9/453
715/705

(Continued)

*Primary Examiner* — Namrata Boveja
*Assistant Examiner* — Divesh Patel
(74) *Attorney, Agent, or Firm* — Harrity & Harrity, LLP

(57) ABSTRACT

In some implementations, a device may receive, from a user device, a query for information from a user. The device may receive, from an enterprise system, data identifying products and services to be offered by the user. The device may process the query and the data, with a model, to identify a subject of the query and a context for the subject. The device may process the subject and the context, with a model, to determine a workflow for the user. The device may process the data, the subject of the query, and the context for the subject, with a model, to determine a key performance indicator or a decision associated with one of the products or the services. The device may provide information identifying the workflow, the key performance indicator, and/or the decision to the user device via a virtual assistant or a user interface.

20 Claims, 10 Drawing Sheets

(51) Int. Cl.
  *G06Q 40/08* (2012.01)
  *G06Q 10/0639* (2023.01)
  *G06F 40/40* (2020.01)
  *G06F 16/953* (2019.01)
  *G06N 20/00* (2019.01)
  *G06Q 30/0201* (2023.01)
  *G06Q 30/018* (2023.01)
  *H04L 9/40* (2022.01)
  *G06Q 10/0635* (2023.01)
  *G06F 3/0482* (2013.01)

(52) U.S. Cl.
  CPC ............. *G06Q 40/08* (2013.01); *H04L 63/08* (2013.01); *G06F 3/0482* (2013.01)

(56) References Cited

U.S. PATENT DOCUMENTS

| | | | |
|---|---|---|---|
| 2014/0244317 A1* | 8/2014 | Roberts | G06Q 40/08 705/4 |
| 2016/0057150 A1* | 2/2016 | Choi | H04L 63/104 726/1 |
| 2016/0283463 A1* | 9/2016 | M R | G06F 16/243 |
| 2018/0341685 A1* | 11/2018 | Indyk | G06F 16/00 |
| 2019/0213354 A1* | 7/2019 | Bhowan | G06N 20/00 |
| 2020/0150937 A1* | 5/2020 | Smith | G06N 3/02 |

* cited by examiner

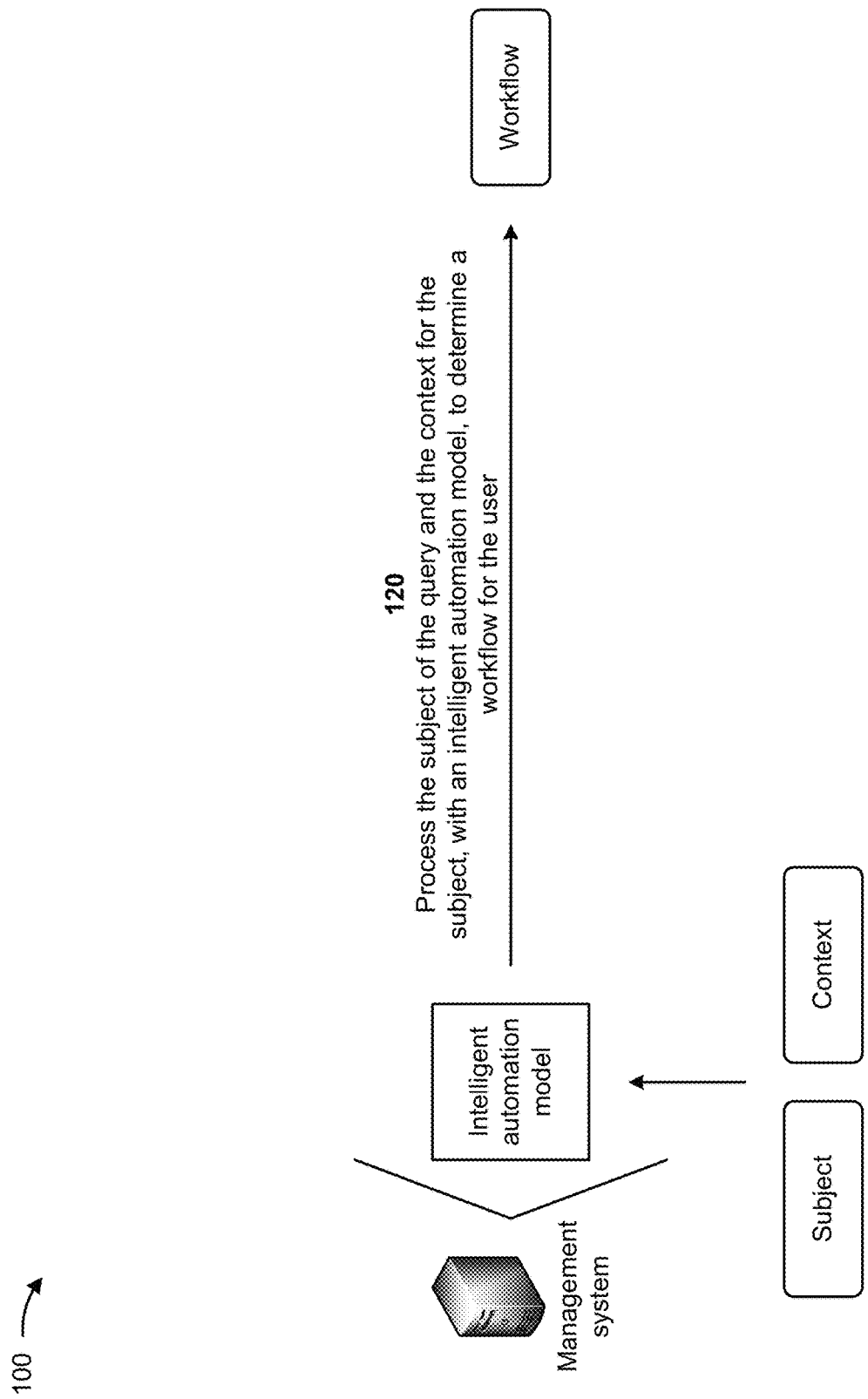

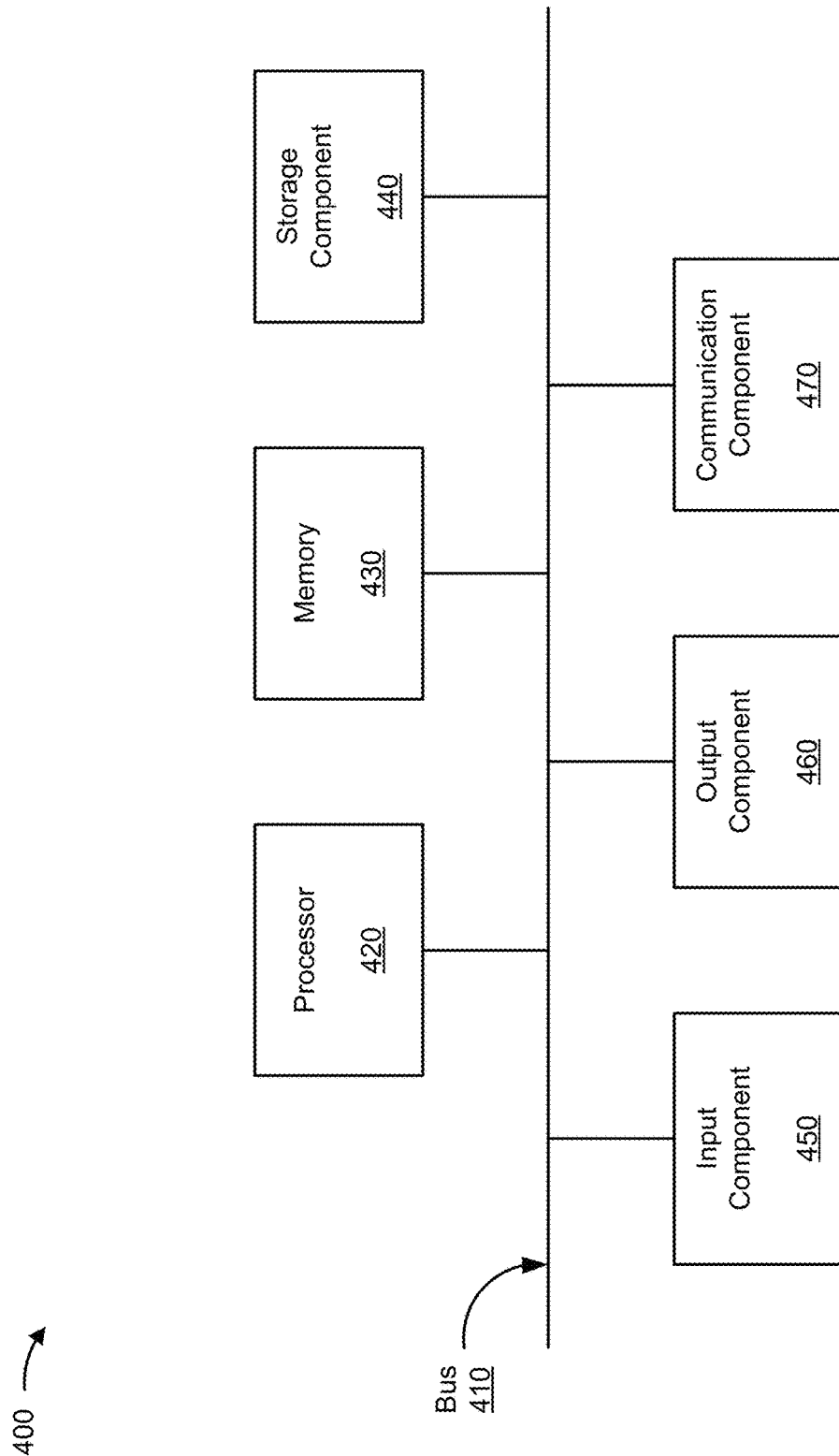

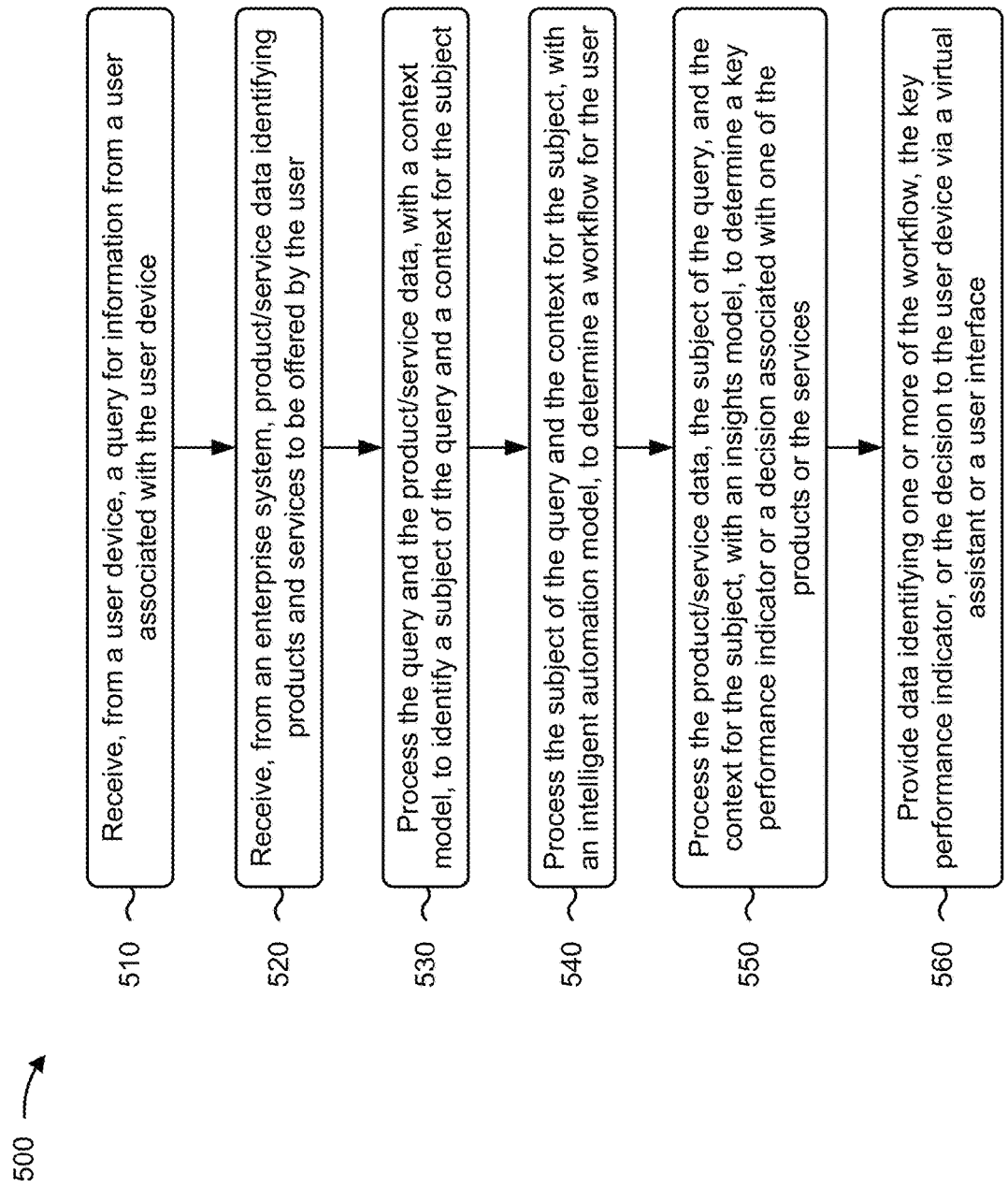

UTILIZING MACHINE LEARNING MODELS FOR IDENTIFYING A SUBJECT OF A QUERY, A CONTEXT FOR THE SUBJECT, AND A WORKFLOW

BACKGROUND

Enterprise software is computer software used to satisfy needs of an organization rather than individual users. Such organizations may include businesses, schools, interest-based user groups, clubs, charities, and governments. Enterprise software is an integral part of a computer-based information system, and a collection of such software is called an enterprise system.

SUMMARY

In some implementations, a method includes receiving, by a device and from a user device, a query for information from a user associated with the user device; receiving, by the device and from an enterprise system, product/service data identifying products and services to be offered by the user; processing, by the device, the query and the product/service data, with a context model, to identify a subject of the query and a context for the subject; processing, by the device, the subject of the query and the context for the subject, with an intelligent automation model, to determine a workflow for the user; processing, by the device, the product/service data, the subject of the query, and the context for the subject, with an insights model, to determine a key performance indicator or a decision associated with one of the products or the services; and providing, by the device, data identifying one or more of the workflow, the key performance indicator, or the decision to the user device via a virtual assistant or a user interface.

In some implementations, a device includes one or more memories; and one or more processors, communicatively coupled to the one or more memories, configured to: receive, from a user device, a query for information from a user associated with the user device; receive, from an enterprise system, product/service data identifying products and services to be offered by the user; process the query and the product/service data, with a context model, to identify a subject of the query and a context for the subject; process the subject of the query and the context for the subject, with an intelligent automation model, to determine a workflow for the user; process the product/service data, the subject of the query, and the context for the subject, with an insights model, to determine a key performance indicator or a decision associated with one of the products or the services; and perform one or more actions based on data identifying one or more of the workflow, the key performance indicator, or the decision.

In some implementations, a non-transitory computer-readable medium storing a set of instructions includes one or more instructions that, when executed by one or more processors of a device, cause the device to: provide a virtual assistant or a user interface to a user device, wherein a user of the user device provides a query for information to the virtual assistant or the user interface via a text input or a voice input to the user device; receive the query for information via the virtual assistant or via the user interface; receive, from an enterprise system, product/service data identifying products and services to be offered by the user; process the query and the product/service data, with a context model, to identify a subject of the query and a context for the subject; process the subject of the query and the context for the subject, with an intelligent automation model, to determine a workflow for the user; process the product/service data, the subject of the query, and the context for the subject, with an insights model, to determine a key performance indicator or a decision associated with one of the products or the services; and perform one or more actions based on data identifying one or more of the workflow, the key performance indicator, or the decision.

BRIEF DESCRIPTION OF THE DRAWINGS

FIGS. 1A-1F are diagrams of an example implementation described herein.

FIG. 4 is a diagram of example components of one or more devices of FIG. 3.

FIG. 5 is a flowchart of an example process for utilizing machine learning models for identifying a subject of a query, a context for the subject, and a workflow.

DETAILED DESCRIPTION

Figure 1A:
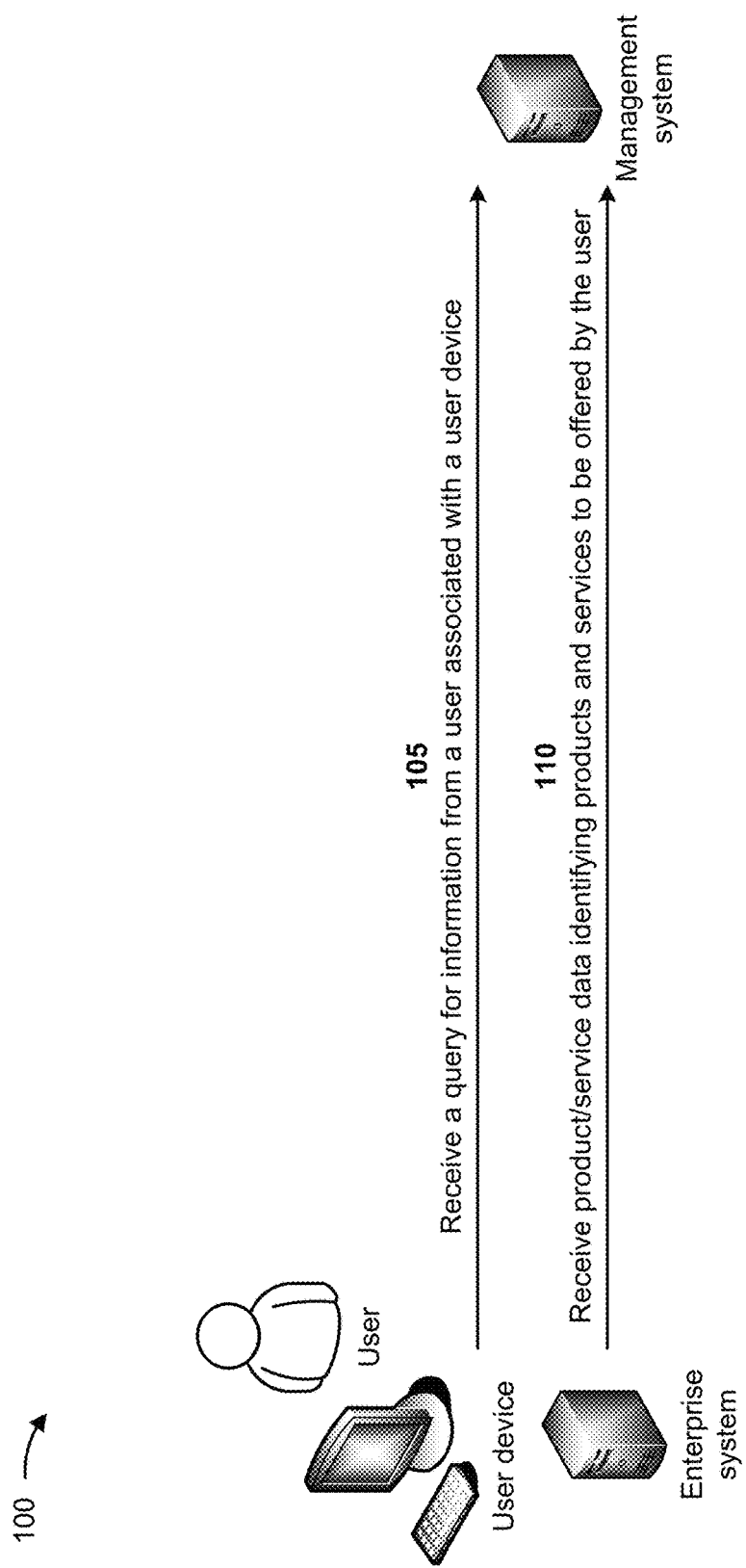

The following detailed description of example implementations refers to the accompanying drawings. The same reference numbers in different drawings may identify the same or similar elements.

Due to a complexity of an enterprise system (e.g., an insurance enterprise system), learning how to utilize the enterprise system may be difficult and may require a significant amount of training. For example, the insurance enterprise system includes complex platforms that provide transactional systems that support an entire insurance lifecycle. Agents, brokers, underwriters, and other business users utilize complex navigation tools and forms to execute everyday tasks. Such users need training and assistance to navigate through the enterprise system and to understand different workflows. This, in turn, wastes computing resources (e.g., processing resources, memory resources, communication resources, and/or the like), human resources, and/or the like associated with training users to utilize the enterprise system, delays caused by untrained users of the enterprise system, correcting mistakes caused by untrained users of the enterprise system, and/or the like.

Some implementations described herein relate to a management system that utilizes machine learning models for identifying a subject of a query from a user, a context for the subject, and a workflow for the user. For example, the management system may receive, from a user device associated with a user, a query for information from the user. The management system may receive, from an enterprise system, data identifying products and services to be offered by the user. The management system may process the query and the data with a context model to identify a subject of the query and a context for the subject. The management system may process the subject of the query and the context for the subject with an intelligent automation model to determine a workflow for the user. The management system may process the data, the subject of the query, and the context for the subject with an insights model to determine a key performance indicator (KPI) or a decision associated with one of the products or the services. The management system may provide data identifying the workflow, the KPI, and/or the decision to the user device via a virtual assistant and/or a user interface.

In this way, the management system utilizes machine learning models to identify a subject of a query, a context for the subject, and a workflow. The management system may define, map, and/or validate business context for the subject of the query. The management system may generate a workflow for the user based on the subject, may automate execution of the workflow, and may provide information associated with the workflow to the user. The management system may process data from the enterprise system and may determine key performance indicators, decision support, and reports based on processing the data. This, in turn, conserves computing resources, human resources, and/or the like that would otherwise have been wasted in training users to utilize the enterprise system, experiencing delays caused by untrained users of the enterprise system, correcting mistakes caused by untrained users of the enterprise system, and/or the like.

Further, the management system assists the user in navigating the enterprise system based on a user persona (e.g., a position, a title, and/or the like) associated with the user. The management system can extract and render data from multiple screens thereby providing the user a consolidated view of data related to a particular topic, task, and/or the like. Further, by defining, mapping and/or validating business context for the subject of a query, the management system may provide the user with operational and/or business insights such as team statistics (e.g., task assignments, underwriting cycle time, quantity of submissions, and/or the like), new business opportunities, customer retention KPIs, and/or the like.

FIGS. 1A-1F are diagrams of an example 100 associated with utilizing machine learning models for identifying a subject of a query, a context for the subject, and a workflow. As shown in FIGS. 1A-1F, example 100 includes a user device and an enterprise system associated with a user and a management system. The user device may include a laptop computer, a mobile telephone, a desktop computer, and/or the like utilized by the user. The enterprise system may include a device that collects and/or determines product/service data identifying products and services to be offered by the user. The management system may include a system that utilizes machine learning models for identifying a subject of a query, a context for the subject, and a workflow.

As shown in FIG. 1A, and by reference number 105, the management system receives a query for information from a user associated with a user device. As an example, a user may be associated with an entity (e.g., an organization, a business, a government agency, and/or the like). For example, the user may be an employee or a customer of the entity. The entity may utilize enterprise software executing on the enterprise system. The user may utilize the user device to access the enterprise software to perform a function. The user may be unfamiliar with utilizing the enterprise software to perform the function and the user may submit a query for information associated with performing the function.

In some implementations, the management system receives the query for information via a virtual assistant associated with the management system. For example, the management system may provide a virtual assistant to the user device. The virtual assistant may comprise a software agent (e.g., a chat bot) that is configured to perform tasks and/or services for the user based on commands or questions (e.g., queries) provided to the virtual assistant by the user.

The user may provide the query to the virtual assistant. For example, the user may utilize a microphone of the user device to input an audio input (e.g., the user may speak the query into the microphone). The virtual assistant may receive the query and may cause the user device to provide the query to the management system.

Alternatively, and/or additionally, the management system may receive the query via a user interface associated with the management system. For example, the management system may provide a user interface to the user device. In some implementations, the user interface may be provided in conjunction with the virtual assistant. The user may input the query via the user interface and the user interface may cause the user device to provide the query to the management system. In some implementations, the user may input the query as text into a field of the user interface.

In some implementations, the user may select the query from a list of queries accessed via a menu or a selectable option provided by the user interface. The management system may determine one or more parameters associated with the user. For example, the management system may determine a role of the user (e.g., a customer, an employee, a technician, a service executive, an agent, an underwriter, a manager, an insurance adjuster, and/or the like), a set of actions (e.g., navigating from a first screen to a second screen, inputting data into a particular field of a user interface, and/or the like) performed prior to submitting the query, a function frequently performed by the user, and/or the like.

The management system may determine a set of functions the user may be attempting to perform based on the one or more parameters. For example, the management system may determine a group of functions associated with the role of the user, a group of functions associated with the set of actions performed by the user prior to submitting the query, the function frequently performed by the user, and/or the like. The management system may determine the list of queries based on the set of functions. For example, the management system may determine the list of queries based on accessing a data structure (e.g., a database, a list, a table, and/or the like) storing information mapping functions to queries.

As shown by reference number 110, the management system receives product/service data identifying products and services to be offered by the user from the enterprise system. In some implementations, the management system periodically (e.g., daily, weekly, monthly, and/or the like) receives product/service data from the enterprise system. In some implementations, the management system receives the product/service data based on providing a request for the product/service data to the enterprise system. For example, the management system may transmit a request for the product/service data to the enterprise system based on receiving the query. In some implementations, the management system receives the product/service data based on an occurrence of an event, such as a change to the product/service data, an expiration of a period of time (e.g., a twenty-four-hour period of time), and/or the like.

The product/service data may include data associated with a product and/or a service to be offered by, or to, the user. For example, the product/service data may include data identifying training associated with utilizing the enterprise system, a new product offering, a new service offering, a change to one of the products, a change to one of the services, billing associated with one of the products, billing associated with one of the services, management associated with one of the products, and/or management associated with one of the services.

Figure 1B:
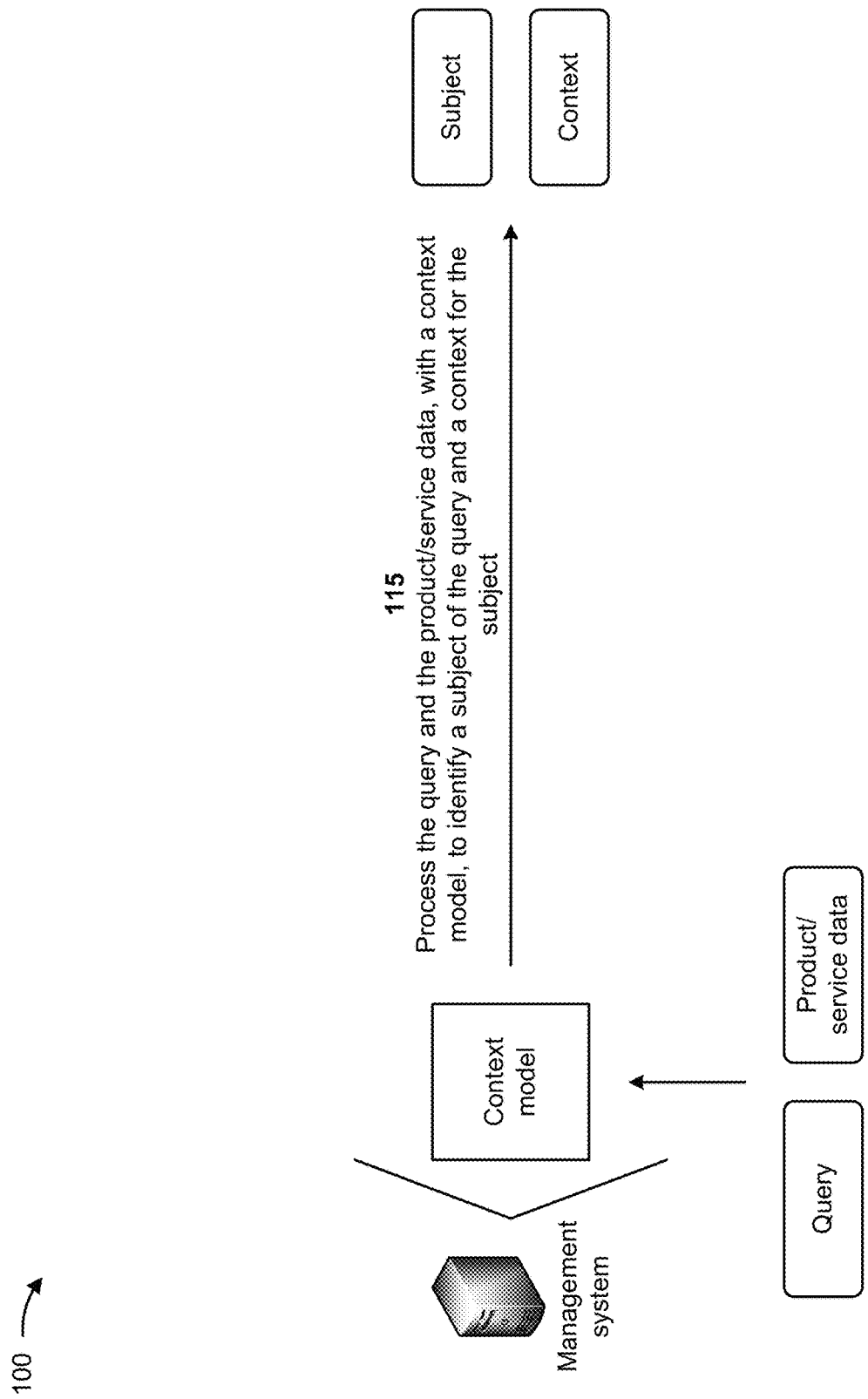

As shown in FIG. 1B, and by reference number 115, the management system processes the query and the product/service data, with a context model, to identify a subject of the query and a context for the subject. The subject of the query may be an entity, a thing, a phrase, and/or the like related to the query. For example, the subject of the query may be a time period (e.g., a particular month, a policy period for an insurance policy, and/or the like), an instruction (e.g., billing instructions, instructions for performing a particular task, and/or the like), a document (e.g., an insurance policy, a contract, a terms of use document, and/or the like) a product, a service, an issue the user is experiencing, a function that the user is attempting to perform, a feature of the management system that the user is accessing, and/or the like.

The context for the subject may include information that can be used to determine meaning associated with the subject of the query. For example, the context may include information indicating a set of circumstances associated with the user providing the query to the management system, such as the user attempting to access a particular file, the user attempting to navigate to a particular user interface, and/or the like. The context may include a context associated with one of the products, a context associated with one of the services, a context associated with an entity associated with the products and/or the services, a context associated with the function that the user is attempting to perform, a context associated with a task associated with the function the user is attempting to perform, and/or the like.

As an example, the user may be viewing two different types of insurance policies (e.g., a first policy and a second policy). The user may not be able to determine a significant difference between the two policies and may input the query "how is the first policy different?". The subject of the query may be the first policy and the context for the subject may be a comparison between the first policy and the second policy.

The management system may determine the subject of the query based on performing natural language processing (NLP). For example, the management system may perform one or more NLP techniques on the query to determine a set of key words associated with the query. The management system may determine the subject based on the set of key words.

In some implementations, the management system may perform preprocessing on the query. For example, the query may include a text input and the management system may convert text to lowercase, remove punctuation, remove stop words, strip white space, perform stemming, perform lemmatization, spell out abbreviations and acronyms, and/or the like. In some implementations, the management system may remove sparse words, such as words that are uncommon (e.g., according to a domain-specific corpus, and/or the like).

In some implementations, the query may include an audio input and the management system may preprocess the query by converting the audio input into text. The management system may preprocess the text in a manner similar to that described above. Preprocessing for NLP may improve accuracy of NLP and conserve computing resources that would otherwise be used to perform NLP in a less efficient fashion for an un-preprocessed data set.

In some implementations, management system may execute a first NLP technique for analyzing unstructured documents. For example, the management system may analyze unstructured queries using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the management system may analyze structured queries (e.g., a query selected from a list of queries provided by the management system) using a second NLP technique (e.g., a metadata-based NLP technique and/or a similar type of technique).

In some implementations, the management system may execute a token-based NLP technique, such as a technique using regular expressions, to identify the subject. For example, the management system may reference a data structure that stores regular expressions that may be used to identify a subject associated with a query (e.g., provide claim history, provide billing instructions, and/or the like). The management system may use the regular expressions to identify the subject based on comparing the regular expressions and information included in the query.

Additionally, or alternatively, the management system may execute an approximation-based NLP technique, such as a fuzzy text search technique, to identify the subject. For example, the management system may execute an approximation-based NLP technique to identify data that satisfies a threshold level of similarity with data stored in a data structure. In this case, the management system may set a threshold level of similarity (e.g., a percentage, a number of characters, and/or the like) and may compare information included in the query to information stored in the data structure. If the management system determines that the threshold level of similarity is satisfied, the management system may identify the information as information identifying the subject of the query.

In some implementations, the management system may use multiple NLP techniques, and may filter outputs of the multiple NLP techniques into a set of values identifying key words included in the query. For example, the management system may identify a first set of values using a first one or more NLP techniques. Additionally, the management system may identify a second set of values using a second one or more NLP techniques. In some implementations, a mixture of overlapping values and conflicting values may occur. In these implementations, the management system may address the conflicting values by filtering the first set of values and the second set of values into a third set of values that excludes duplicate values, excludes conflicting values (e.g., by selecting one value, of two conflicting values, using a rule, such a threshold), and/or the like. The management system may use the third set of values as the set of values identifying the key words corresponding to the subject.

In some implementations, the management system may execute one or more of the above-mentioned NLP techniques on a particular type of query, a query input by a particular user, a query input by a user associated with a particular role, and/or a query received from a particular user device, and/or the like. Additionally, or alternatively, the management system may take an average, or a weighted average, of the outputs of the one or more NLP techniques being deployed to identify the features. As an example, the management system may assign a weight to an output associated with each additional NLP technique and may take an average or a weighted average to identify the subject.

The management system may determine a context associated with the subject. The context may include content included in the query and/or information indicating an intent associated with the content (e.g., information indicating what the user intends to accomplish by submitting the query). In some implementations, the management system determines the context based on a mapping of defined contexts to semantics derived from subjects. The management system may determine a plurality of subject entities based on a subject matter with which the enterprise system is associated. For example, the enterprise system may be associated with managing insurance policies issued by an insurance company and the management system may determine a plurality subject entities associated with insurance policies such as policy period, policy, billing instructions, claim history, insured, claimant, policy coverage period, coverage amount, issuance date, and/or the like.

The management system may derive a semantic from a subject entity, of the plurality of subject entities. The management system may define a context associated with the semantic. In some implementations, the management system defines the context associated with the semantic based on historical query information associated with the semantic. The historical query information may include queries previously submitted by users, responses provided in response to the queries, and/or feedback information indicating a degree to which the responses satisfied the queries. The management system may identify a set of queries that include the semantic, a set of responses associated with the set of queries, and feedback information associated with the set of responses. The management system may determine a context associated with the semantic based on the set of queries, the set of responses, and the feedback information associated with the set of responses. The management system may store information mapping the semantic to the determined context in a data structure. In some implementations, the management system determines a plurality of semantics for the subject entity and/or for each of the plurality of subject entities. The management system may determine a respective context for each of the plurality of semantics and may store, in the data structure, information mapping the plurality of semantics to the respective contexts, in a manner similar to that described above.

In some implementations, the management system determines the context based on a role associated with the user. The management system may identify the user of the user device. For example, the user may utilize a set of credentials (e.g., a username and/or password) to access the enterprise system and the management system may identify the user based on the set of credentials. The management system may determine a role (e.g., employee, customer, team leader, supervisor, department head, manager, underwriter, service executive, and/or the like) associated with the user based on identifying the user. For example, the management system may determine the role associated with the user based on accessing a data structure storing information mapping users to respective roles associated with the users. The management system may obtain (e.g., from a data structure) role information for the role associated with the user. The role information may include information identifying a job description, a title, a purpose, an objective, a responsibility, a computing resource that a user associated with the role is permitted to access, a computing resource that a user associated with the role is prohibited from accessing, a task, a workflow, and/or the like associated with the role associated with the user. The management system may determine the context for the subject based on the role information for the role associated with the user.

In some implementations, the management system determines the context based on a navigation history associated with the user utilizing the enterprise system. The management system may monitor actions performed by the user within the enterprise system. The management system may determine a portion (a page, a screen, a user interface, and/or the like) of the enterprise system currently accessed by the user and/or a portion of the enterprise system previously accessed by the user based on monitoring the actions performed by the user. The management system may determine the context for the subject based on the portion of the enterprise system currently accessed by the user and/or the portion of the enterprise system previously accessed by the user.

As shown in FIG. 1C, and by reference number 120, the management system processes the subject of the query and the context for the subject, with an intelligent automation model, to determine a workflow for the user. The management system may determine one or more events based on the subject of the query and the context for the subject. The one or more events may include one or more actions to be performed to provide a response to the query. The management system may determine the workflow based on the one or more events. The workflow may include information identifying the one or more actions, instructions for performing the one or more actions, information identifying an order in which the one or more actions are to be performed, and/or the like.

As an example, the subject of the query may be a particular report and the context of the query may be that the user is looking for information indicating how to use the enterprise system to generate the particular report. In some implementations, the management system accesses a data structure storing information associated with generating the particular report, such as a user manual that includes information identifying a set of events associated with generating the particular report and/or a respective set of actions associated with each event of the set of events. Alternatively, and/or additionally, the management system may obtain the information associated with generating the particular report from the product/service data. The set of events may include a first event associated with obtaining data to be included in the report, a second event associated with analyzing the obtained data, and a third event associated with generating the report. The first event may be associated with a first set of actions for causing the enterprise system to obtain data to be included in the particular report. The second event may be associated with a second set of actions for causing the enterprise system to analyze the obtained data. The third event may be associated with a third set of actions for causing the enterprise system to generate the particular report. The management system may determine a workflow associated with generating the report based on the first event, the second event, the third event, the first set of actions, the second set of action, and/or the third set of actions.

Figure 1D:
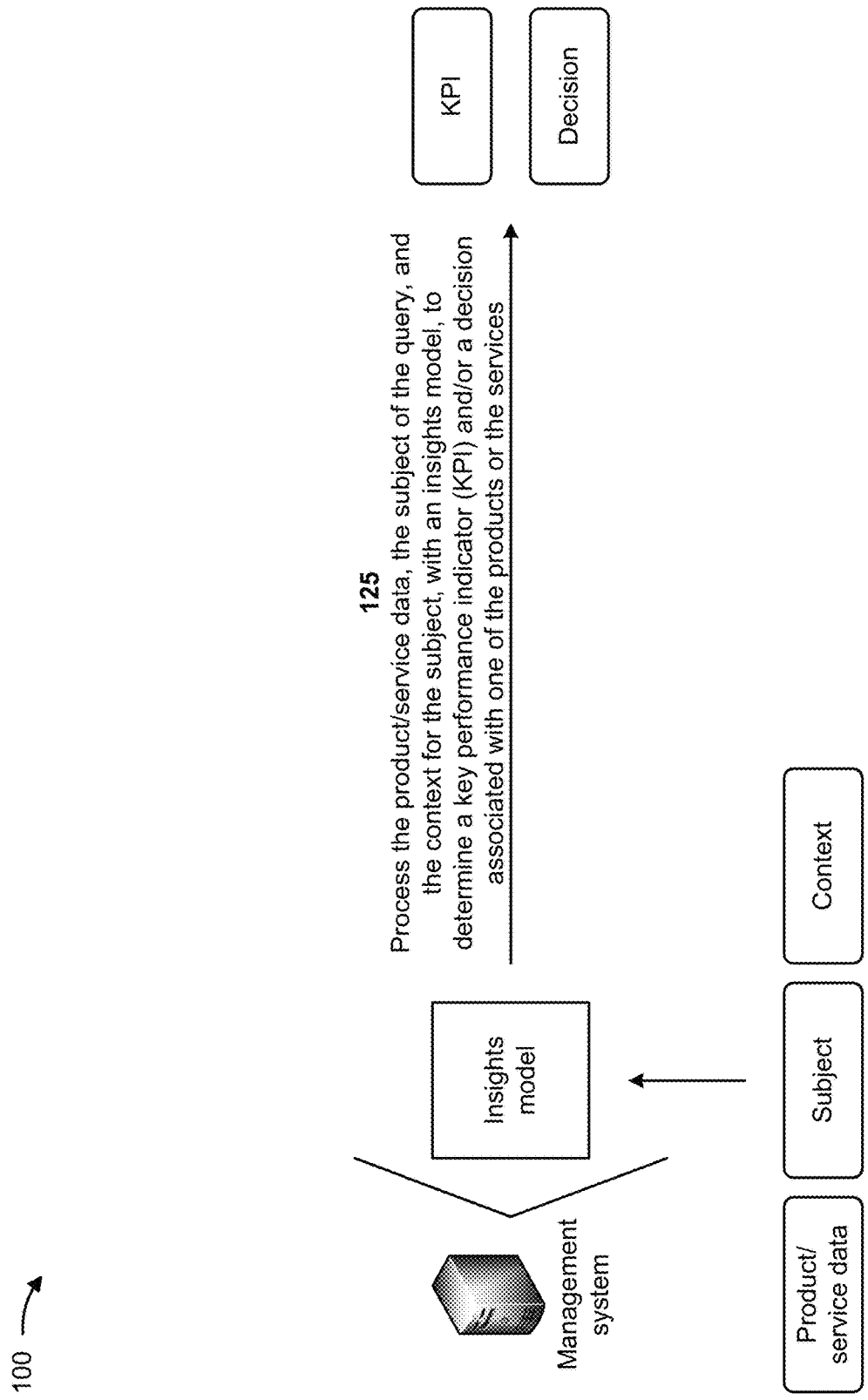

In some implementations, the management system determines a KPI and/or a decision associated with the query. For example, as shown in FIG. 1D, and by reference number 125, the management system processes the product/service data, the subject of the query, and the context for the subject, with an insights model, to determine a KPI and/or a decision associated with one of the products or the services. The insights model may include a random forest model, a linear regression model, a neural network model, and/or a classification model configured to determine a KPI and/or a decision based on the product/service data, the subject of the query, and the context for the subject.

In some implementations, the management system converts the product/service data into a format compatible with the insights model. For example, the management system may convert the product/service data into a series of vectors and/or may preprocess the product/service data in a manner similar to that described above with respect to performing NLP on the query. The management system may provide the formatted product/service data, the subject of the query, and the context for the subject as inputs to the insights model. The insights model may process the formatted product/service data, the subject of the query, and the context for the subject and may generate an output based on the processing. The output may include information indicating a KPI and/or a decision associated with the subject and/or the context for the subject.

In some implementations, the management system may determine the KPI or the decision based on a risk score associated with one of the products or the services. As an example, the subject may be an insurance policy and the context may be whether to issue an insurance policy to a customer. The management system may process the product/service data, the subject of the query, and the context for the subject, with the insights model, to generate a risk score associated with issuing the insurance policy to the customer. The management system may determine the KPI (e.g., an average risk score associated with potential customers) or the decision (e.g., a decision to issue the policy to the customer, a decision not to issue the policy to the customer, a decision to have the decision to issue (or to not issue) the policy reviewed by another user (e.g., a user associated with an underwriter role), and/or the like) based on the risk score.

Figure 1E:
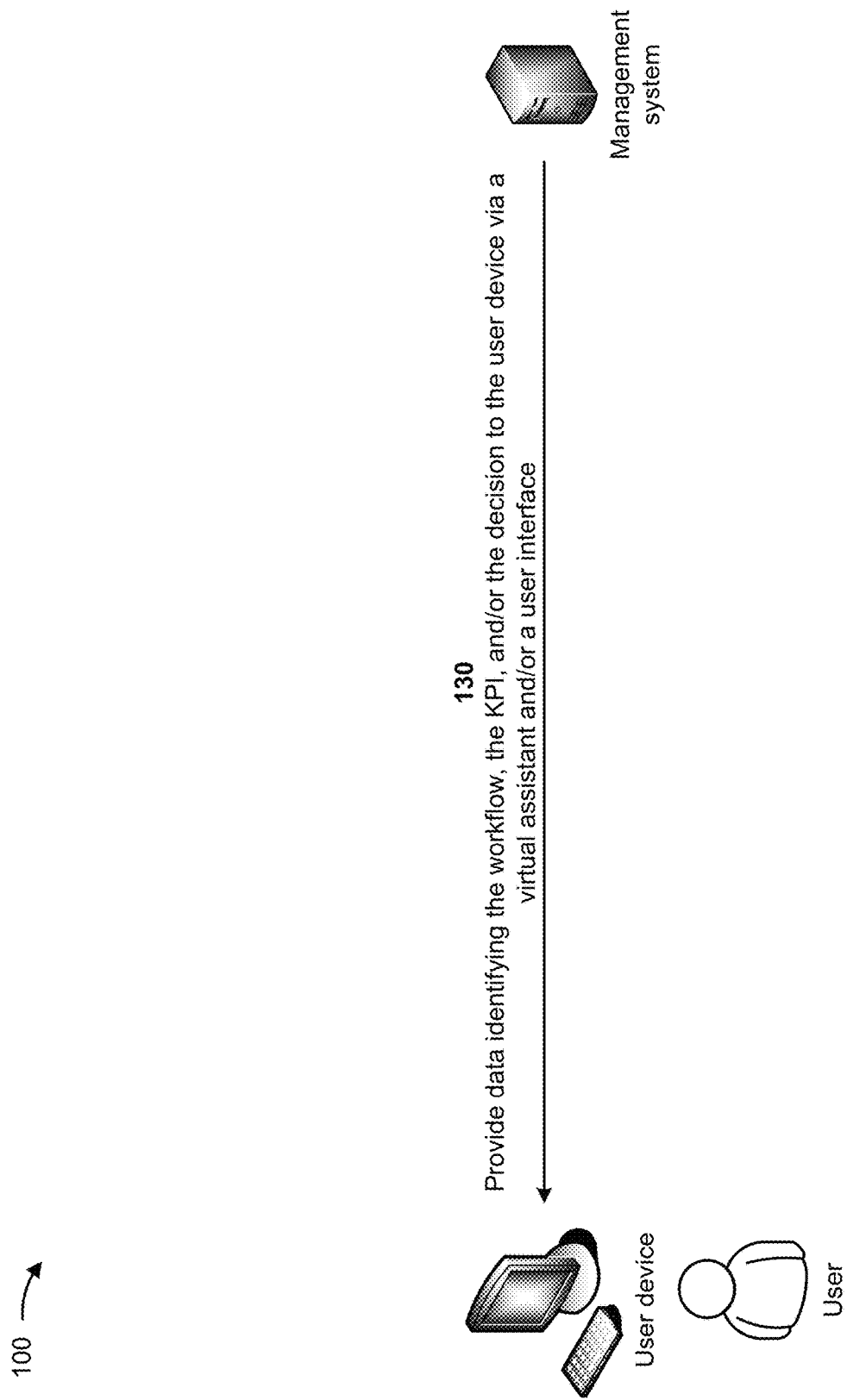

As shown in FIG. 1E, and by reference number 130, the management system provides data identifying the workflow, the KPI, and/or the decision to the user device via the virtual assistant and/or the user interface. In some implementations, the user reviews the workflow, the KPI, and/or the decision and provides feedback indicating a degree to which the workflow, the KPI, and/or the decision satisfied the query. The management system may utilize the feedback to retrain the context model, the intelligent automation model, and/or the insights model, as described below.

Figure 1F:
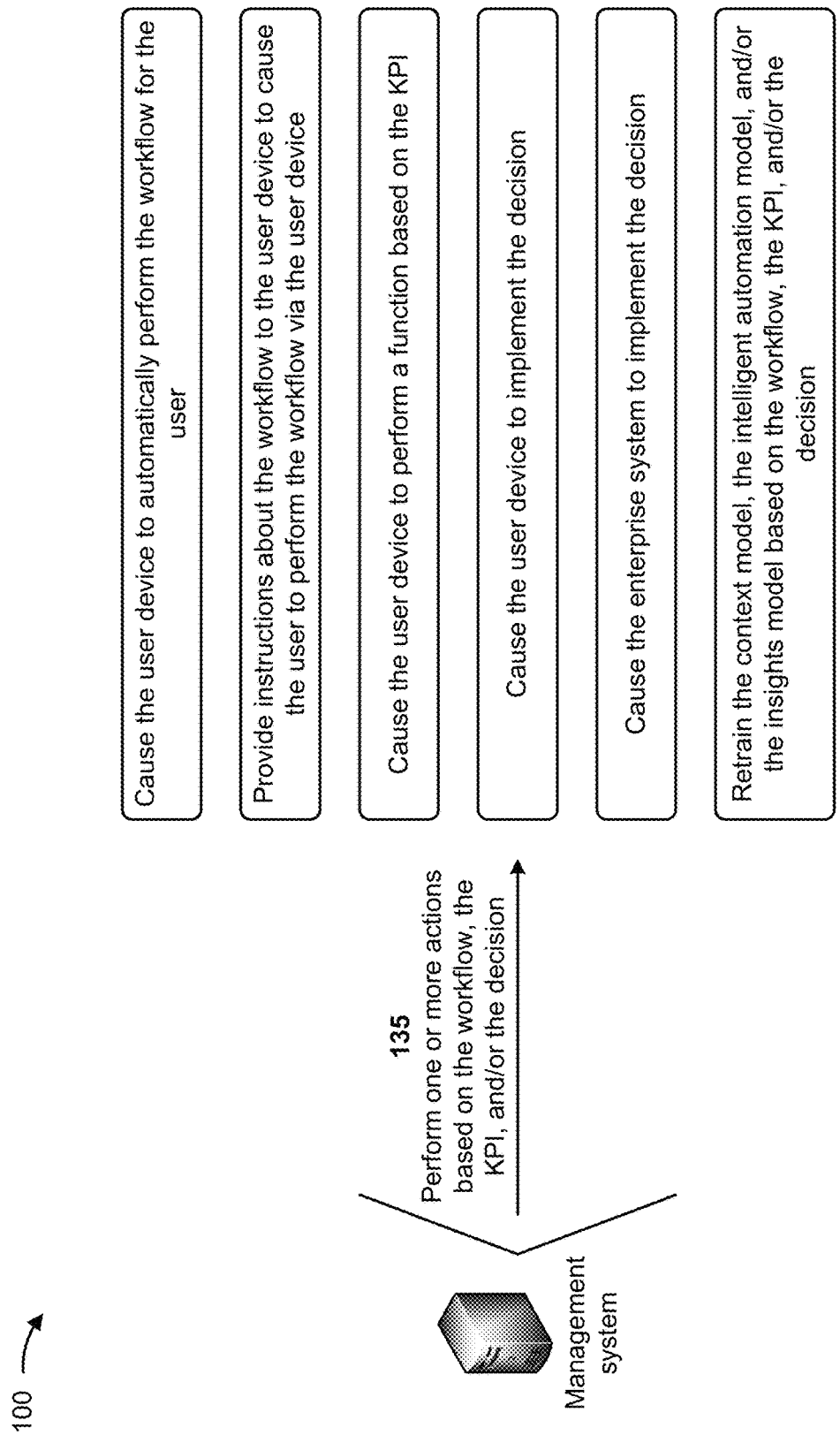

As shown in FIG. 1F, and by reference number 135, the management system may perform one or more actions based on the workflow, the KPI, and/or the decision. In some implementations, the one or more actions include the management system causing the user device to automatically perform the workflow for the user. In some implementations, the management system causes the user device to automatically perform the workflow for the user based on the context for the subject. For example, the management system may determine that the subject was an insurance policy issued to a customer and the context for the subject was that the user wanted to view the insurance policy issued to the customer. The management system may automatically perform a workflow associated with obtaining the insurance policy and causing the user device to provide the insurance policy for display to the user based on the context for the subject being that the user wanted to view the insurance policy (rather than the context being that the user wanted to know how to obtain a copy of the insurance policy).

In some implementations, the one or more actions include the management system providing instructions about the workflow to the user device to cause the user to perform the workflow via the user device. The management system may provide the instructions about the workflow via the user interface (e.g., by causing the user device to display the instructions in a text format) and/or via the virtual assistant (e.g., by causing the virtual assistant to output an audio and/or video format of the instructions).

In some implementations, the one or more actions include the management system causing the user device to perform a function based on the KPI. For example, the KPI may be associated with a proficiency of the user associated with utilizing the enterprise system to perform a particular function and the management system may cause the user device to provide a training video associated with performing the particular function for display to the user based on the KPI satisfying a KPI threshold. In this way, the management system may provide relevant, targeted training to the user thereby increasing a proficiency of the user associated with utilizing the enterprise system.

In some implementations, the one or more actions include the management system causing the user device to implement the decision. The management system may cause the user device to implement the decision based on the context for the subject of the query. As an example, the subject may be an insurance policy. The context for the subject may be determining whether to issue the insurance policy to a customer. The management system may process the product/service data, the subject of the query, and the context for the subject with the insights model to determine a decision associated with whether to issue the insurance policy to the customer. The decision may be a decision to issue the insurance policy to the customer. The management system may provide the decision to the user device to cause user device to perform one or more actions associated with issuing the insurance policy to the customer.

In some implementations, the one or more actions include the management system retraining the context model, the intelligent automation model, and/or the insights model based on the workflow, the KPI, and/or the decision. The management system may utilize the workflow, the KPI, and/or the decision as additional training data for retraining the context model, the intelligent automation model, and/or the insights model, thereby increasing the quantity of training data available for training the context model, the intelligent automation model, and/or the insights model. Accordingly, the management system may conserve computing resources associated with identifying, obtaining, and/or generating historical data for training the context model, the intelligent automation model, and/or the insights model relative to other systems for identifying, obtaining, and/or generating historical data for training machine learning models.

In this way, the management system utilizes machine learning models for identifying a subject of a query, a context for the subject, and a workflow. The management system may define, map, and/or validate business context for a subject of a user query of an enterprise system. The management system may generate a workflow for the user based on the subject, may automate execution of the workflow, and may provide the workflow to the user. The management system may process data from the enterprise system and may determine key performance indicators, decision support, and reports based on processing the data. This, in turn, conserves computing resources, networking resources, and/or the like that would otherwise have been wasted in training users for utilizing the enterprise system, experiencing delays caused by untrained users of the enterprise system, correcting mistakes caused by untrained users of the enterprise system, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
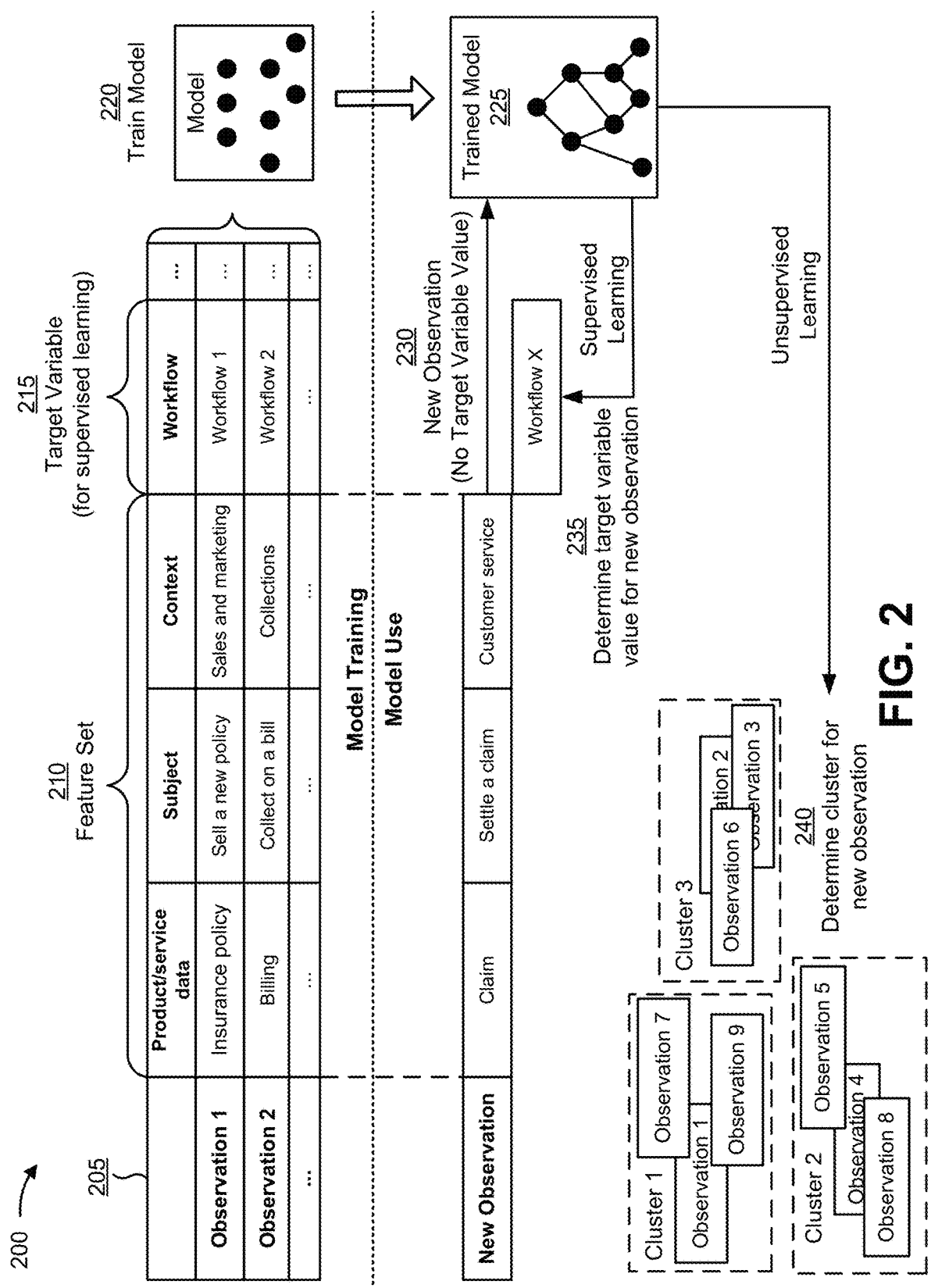
FIG. 2 is a diagram illustrating an example of training and using a machine learning model in connection with identifying a subject of a query, a context for the subject, and a workflow.

FIG. 2 is a diagram illustrating an example 200 of training and using a machine learning model in connection with identifying a subject of a query, a context for the subject, and a workflow. The machine learning model training and usage described herein may be performed using a machine learning system. The machine learning system may include or may be included in a computing device, a server, a cloud computing environment, and/or the like, such as the management system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the management system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the management system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of product/service data, a second feature of subject data, a third feature of context data, and so on. As shown, for a first observation, the first feature may have a value of an insurance policy, the second feature may have a value of sell a new policy, the third feature may have a value of sales and marketing, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a workflow, which has a value of workflow 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of a claim, a second feature of settle a claim, a third feature of customer service, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of workflow X for the target variable of workflow for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a product/service data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a subject data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identify a subject of a query, a context for the subject, and a workflow. The machine learning system enables recognition and/or identification of tens, hundreds, thousands, or millions of features and/or feature values for tens, hundreds, thousands, or millions of observations, thereby increasing accuracy and consistency and reducing delay associated with identifying a subject of a query, a context for the subject, and a workflow relative to requiring computing resources to be allocated for tens, hundreds, or thousands of operators to manually identify a subject of a query, a context for the subject, and a workflow.

As indicated above, FIG. 2 is provided as an example. Other examples may differ from what is described in connection with FIG. 2.

Figure 3:
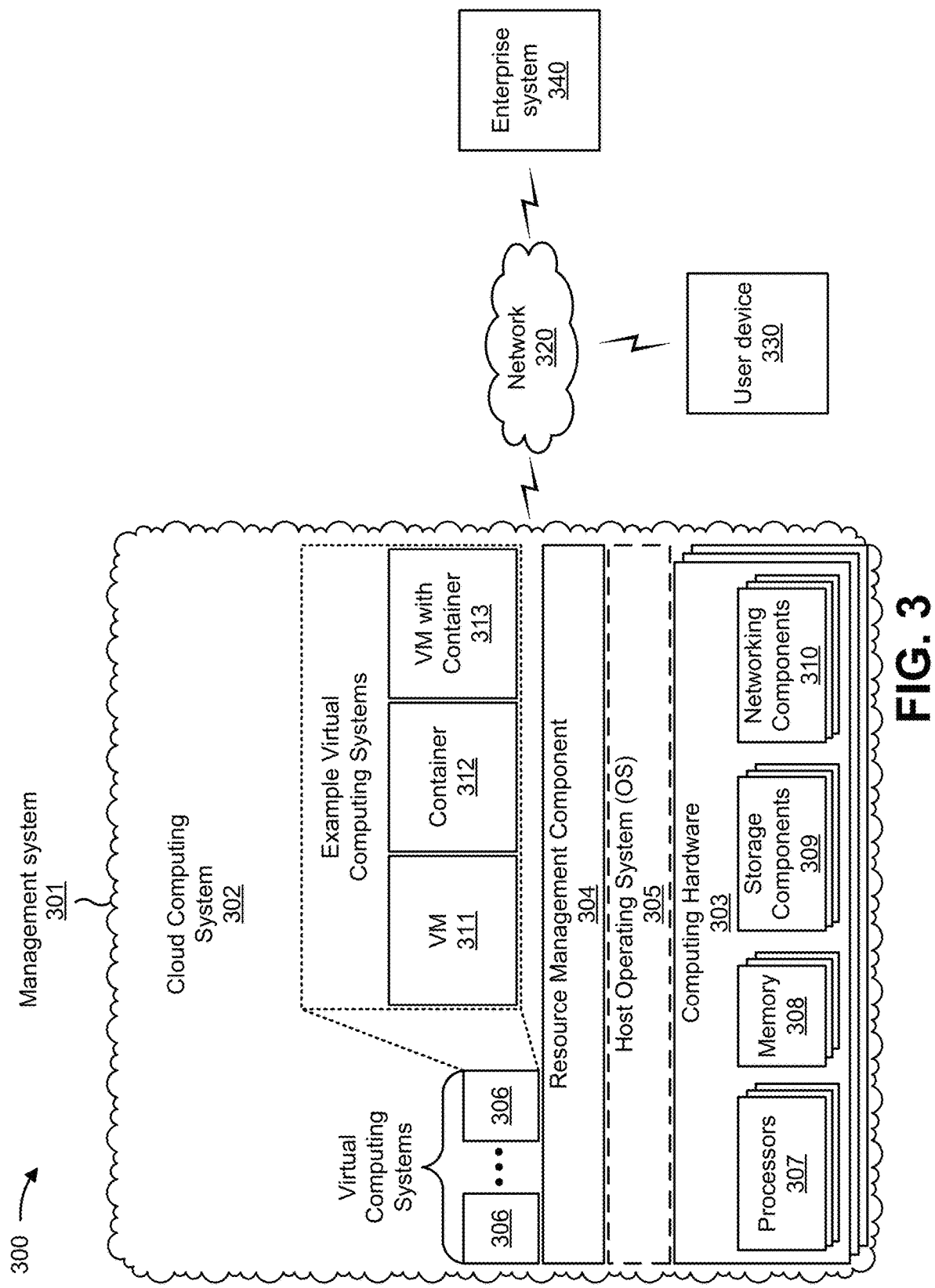
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a management system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or an enterprise system 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the management system 301 may include one or more elements 303-313 of the cloud computing system 302, may execute within the cloud computing system 302, and/or may be hosted within the cloud computing system 302, in some implementations, the management system 301 may not be cloud-based (e.g., may be implemented outside of a cloud computing system) or may be partially cloud-based. For example, the management system 301 may include one or more devices that are not part of the cloud computing system 302, such as device 400 of FIG. 4, which may include a standalone server or another type of computing device. The management system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Enterprise system 340 includes one or more devices capable of receiving, generating, storing, processing, providing, and/or routing information associated with receiving and/or determining product/service data identifying products and services to be offered by the user, as described elsewhere herein. Enterprise system 340 may include a communication device and/or a computing device. For example, enterprise system 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Enterprise system 340 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to management system 301, user device 330, and/or enterprise system 340. In some implementations, management system 301, user device 330, and/or enterprise system 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing machine learning models for identifying a subject of a query, a context for the subject, and a workflow. In some implementations, one or more process blocks of FIG. 5 may be performed by a device (e.g., management system 301). In some implementations, one or more process blocks of FIG. 5 may be performed by another device or a group of devices separate from or including the device, such as a user device (e.g., user device 330) and/or an enterprise system (e.g., enterprise system 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a user device, a query for information from a user associated with the user device (block 510). For example, the device may receive, from a user device, a query for information from a user associated with the user device, as described above. In some implementations, the device may provide a virtual assistant to the user device. The user may provide the query to the virtual assistant via a text input and/or a voice input to the user device and the device may receive the query for information via the virtual assistant. Alternatively, and/or additionally, the device may provide a user interface to the user device. The user may provide the query to the user interface via a text input to the user device and the device may receive the query for information via the user interface.

As further shown in FIG. 5, process 500 may include receiving, from an enterprise system, product/service data identifying products and services to be offered by the user (block 520). For example, the device may receive, from an enterprise system, product/service data identifying products and services to be offered by the user, as described above. The product/service data may include data identifying training for the enterprise system, a new product offering, a new service offering, a change to one of the products, a change to one of the services, billing associated with one of the products, billing associated with one of the services, management associated with one of the products, and/or management associated with one of the services.

As further shown in FIG. 5, process 500 may include processing the query and the product/service data, with a context model, to identify a subject of the query and a context for the subject (block 530). For example, the device may process the query and the product/service data, with a context model, to identify a subject of the query and a context for the subject, as described above. The context for the subject may include a context associated with one of the products, a context associated with one of the service, and/or a context associated with an entity associated with the products and the services.

In some implementations, processing the query and the product/service data, with the context model, to identify the subject of the query and the context for the subject may comprise mapping defined contexts to semantics derived from the subject, identifying entities associated with the subject, and identifying the context from the defined contexts based on mapping the defined contexts to the semantics and based on the entities. Alternatively, and/or additionally, processing the query and the product/service data, with the context model, to identify the subject of the query and the context for the subject may comprise performing natural language processing of the query to identify the subject of the query, identifying the user of the user device based on user credentials, and identifying the context for the subject based on identifying the user.

As further shown in FIG. 5, process 500 may include processing the subject of the query and the context for the subject, with an intelligent automation model, to determine a workflow for the user (block 540). For example, the device may process the subject of the query and the context for the subject, with an intelligent automation model, to determine a workflow for the user, as described above. In some implementations, processing the subject of the query and the context for the subject, with the intelligent automation model, to determine the workflow for the user may comprise identifying events based on the subject of the query and the context for the subject, determining the workflow based on the events, and generating a notification for the workflow or instructions to perform workflow.

As further shown in FIG. 5, process 500 may include processing the product/service data, the subject of the query, and the context for the subject, with an insights model, to determine a KPI or a decision associated with one of the products or the services (block 550). For example, the device may process the product/service data, the subject of the query, and the context for the subject, with an insights model, to determine a KPI or a decision associated with one of the products or the services, as described above. The insights model may include a random forest model, a linear regression model, a neural network model, and/or a classification model.

In some implementations, processing the product/service data, the subject of the query, and the context for the subject, with the insights model, to determine the KPI or the decision may comprise converting the product/service data into a format compatible with the insights model and to generate formatted product/service data, and processing the formatted product/service data, the subject of the query, and the context for the subject, with the insights model, to determine the KPI or the decision. Alternatively, and/or additionally, processing the product/service data, the subject of the query, and the context for the subject, with the insights model, to determine the KPI or the decision may comprise processing the product/service data, the subject of the query, and the context for the subject, with the insights model, to generate a risk score associated with the one of the products or the services and determining the KPI or the decision based on the risk score.

As further shown in FIG. 5, process 500 may include providing data identifying one or more of the workflow, the KPI, or the decision to the user device via a virtual assistant or a user interface (block 560). For example, the device may provide data identifying one or more of the workflow, the KPI, or the decision to the user device via a virtual assistant or a user interface, as described above.

In some implementations, the device may perform one or more actions based on data identifying one or more of the workflow, the KPI, or the decision. For example, the device may cause the user device to automatically perform the workflow for the user, may provide instructions about the workflow to the user device to cause the user to perform the workflow via the user device, and/or may cause the user device to perform a function based on the KPI. Alternatively, and/or additionally, the device may cause the user device to implement the decision, may cause the enterprise system to implement the decision, and/or may retrain one or more of the context model, the intelligent automation model, or the insights model based on the data identifying one or more of the workflow, the KPI, or the decision.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a user device, a query for information from a user associated with the user device;
   receiving, by the device and from an enterprise system, product/service data identifying products and services to be offered by the user;
   processing, by the device, the query and the product/service data, with a context model, to identify a subject of the query and a context for the subject based on identifying a role of the user,
      wherein identifying the role is based on determining role information, identifying a job description and a computing resource the user is permitted to access based on the role, based on using credentials associated with the user to identify the user and identifying the role based on accessing a data structure storing information mapping the user to the role,
      wherein identifying the context for the subject is based on the role and a navigation history associated with the user, and
      wherein processing the query and the product/service data comprise:
         identifying a first set of values using a first one or more natural language processing (NLP) techniques,
            wherein identifying the first set of values using the first one or more NLP techniques includes:
            executing a token-based NLP technique to identify the subject,
            executing an approximation-based NLP technique to identify the subject, or
            executing a category-based NLP technique to identify to the subject,
         identifying a second set of values using a second one or more NLP techniques,
            wherein identifying the second set of values using the first one or more NLP techniques includes:
            executing the token-based NLP technique to identify the subject,
            executing the approximation-based NLP technique to identify the subject, or
            executing the category-based NLP technique to identify to the subject,
         addressing conflicting values based on filtering the first set of values and the second set of values into a third set of values that excludes the conflicting values, and
         using the third set of values to identify the subject and the context for the subject;
   processing, by the device, the subject and the context for the subject, with an intelligent automation model, to determine a workflow for the user identifying one or more actions, instructions for performing the one or more actions, and information identifying an order in which the one or more actions are to be performed;
   processing, by the device, the product/service data, the subject, and the context for the subject, with an insights model, to determine a key performance indicator or a decision associated with one of the products or the services,
      wherein the key performance indicator is associated with a proficiency of the user with utilizing the enterprise system to perform a particular function; and
   providing, by the device, data identifying one or more of the workflow, the key performance indicator, or the decision to the user device via a virtual assistant or a user interface.

2. The method of claim 1, further comprising one or more of:
   causing the user device to automatically perform the workflow for the user;
   providing instructions about the workflow to the user device to cause the user to perform the workflow via the user device; or
   causing the user device to perform a function based on the key performance indicator.

3. The method of claim 1, further comprising one or more of:
   causing the user device to implement the decision;
   causing the enterprise system to implement the decision; or
   retraining one or more of the context model, the intelligent automation model, or the insights model based on the data identifying one or more of the workflow, the key performance indicator, or the decision.

4. The method of claim 1, wherein processing the subject and the context for the subject, with the intelligent automation model, to determine the workflow for the user comprises:
   identifying events based on the subject and the context for the subject;
   determining the workflow based on the events; and
   generating a notification for the workflow or instructions to perform workflow.

5. The method of claim 1, wherein processing the product/service data, the subject, and the context for the subject, with the insights model, to determine the key performance indicator or the decision comprises:
   converting the product/service data into a format compatible with the insights model and to generate formatted product/service data; and
   processing the formatted product/service data, the subject, and the context for the subject, with the insights model, to determine the key performance indicator or the decision.

6. The method of claim 1, wherein processing the product/service data, the subject, and the context for the subject, with the insights model, to determine the key performance indicator or the decision comprises:

processing the product/service data, the subject, and the context for the subject, with the insights model, to generate a risk score associated with the one of the products or the services; and determining the key performance indicator or the decision based on the risk score.

7. A device, comprising:

one or more memories; and one or more processors, communicatively coupled to the one or more memories, configured to:
- receive, from a user device, a query for information from a user associated with the user device;
- receive, from an enterprise system, product/service data identifying products and services to be offered by the user;
- process the query and the product/service data, with a context model, to identify a subject of the query and a context for the subject based on identifying a role of the user,
  - wherein the one or more processors, to process the query and the product/service data, are configured to:
    - identify the role is based on determining role information, identifying a job description and a computing resource the user is permitted to access based on the role, based on using credentials associated with the user to identify the user and identifying the role based on accessing a data structure storing information mapping the user to the role,
    - identify the context for the subject based on the role and a navigation history associated with the user, and
    - identify a first set of values using a first one or more natural language processing (NLP) techniques including:
      - a token-based NLP technique,
      - an approximation-based NLP technique, or
      - a category-based NLP technique,
    - identify a second set of values using a second one or more NLP techniques including:
      - the token-based NLP technique,
      - the approximation-based NLP technique, or
      - the category-based NLP technique,
    - address conflicting values based on filtering the first set of values and the second set of values into a third set of values that excludes the conflicting values, and
    - use the third set of values to identify the subject and the context for the subject;
- process the subject and the context for the subject, with an intelligent automation model, to determine a workflow for the user identifying one or more actions, instructions for performing the one or more actions, and information identifying an order in which the one or more actions are to be performed;
- process the product/service data, the subject, and the context for the subject, with an insights model, to determine a key performance indicator or a decision associated with one of the products or the services, wherein the key performance indicator is associated with a proficiency of the user with utilizing the enterprise system to perform a particular function; and
- perform the one or more actions based on data identifying one or more of the workflow, the key performance indicator, or the decision.

8. The device of claim 7, wherein the one or more processors, when processing the query and the product/service data, with the context model, to identify the subject and the context for the subject, are configured to:
- perform natural language processing of the query to identify the subject;
- identify the user of the user device based on user credentials; and
- identify the context for the subject based on identifying the user.

9. The device of claim 7, wherein the enterprise system comprises an insurance enterprise system associated with an insurance provider and wherein the product/service data includes data identifying:
- training for the insurance enterprise system,
- a new product offering,
- a new service offering,
- a change to one of the products,
- a change to one of the services, or
- billing associated with one of the products or one of the services.

10. The device of claim 7, wherein the one or more processors, when receiving the query for information from the user associated with the user device, are configured to:
- provide a virtual assistant to the user device,
  - wherein the user provides the query to the virtual assistant via a text input or voice input to the user device; and
- receive the query for information via the virtual assistant.

11. The device of claim 7, wherein the one or more processors, when receiving the query for information from the user associated with the user device, are configured to:
- provide a user interface to the user device,
  - wherein the user provides the query to the user interface via a text input to the user device; and
- receive the query for information via the user interface.

12. The device of claim 7, wherein the insights model includes one or more of:
- a random forest model,
- a linear regression model,
- a neural network model, or
- a classification model.

13. The device of claim 7, wherein the context includes one or more of:
- a context associated with one of the products,
- a context associated with one of the services, or
- a context associated with an entity associated with the products and the services.

14. A non-transitory computer-readable medium storing a set of instructions, the set of instructions comprising:
- one or more instructions that, when executed by one or more processors of a device, cause the device to:
  - provide a virtual assistant or a user interface to a user device,
    - wherein a user of the user device provides a query for information to the virtual assistant or the user interface via a text input or a voice input to the user device;
  - receive the query for information via the virtual assistant or via the user interface;
  - receive, from an enterprise system, product/service data identifying products and services to be offered by the user;
  - process the query and the product/service data, with a context model, to identify a subject of the query and a context for the subject based on identifying a role of the user, wherein the one or more instructions, that cause the one or more processors to process the query and the product/service data, cause the one or more processors to:
- identify the role is based on determining role information, identifying a job description and a computing resource the user is permitted to access based on the role, based on using credentials associated with the user to identify the user and identifying the role based on accessing a data structure storing information mapping the user to the role,
- identify the context for the subject based on the role and a navigation history associated with the user, and
- identify a first set of values using a first one or more natural language processing (NLP) techniques including:
  - a token-based NLP technique,
  - an approximation-based NLP technique, or category-based NLP technique,
- identify a second set of values using a second one or more NLP techniques including:
  - the token-based NLP technique,
  - the approximation-based NLP technique, or
  - the category-based NLP technique,
- address conflicting values based on filtering the first set of values and the second set of values into a third set of values that excludes the conflicting values, and
- use the third set of values to identify the subject and the context for the subject;
- process the subject and the context for the subject, with an intelligent automation model, to determine a workflow for the user identifying one or more actions, instructions for performing the one or more actions, and information identifying an order in which the one or more actions are to be performed;
- process the product/service data, the subject, and the context for the subject, with an insights model, to determine a key performance indicator or a decision associated with one of the products or the services, wherein the key performance indicator is associated with a proficiency of the user with utilizing the enterprise system to perform a particular function; and
- perform the one or more actions based on data identifying one or more of the workflow, the key performance indicator, or the decision.

15. The non-transitory computer-readable medium of claim 14, wherein the one or more instructions, that cause the device to perform the one or more actions, cause the device to one or more of:
- cause the user device to automatically perform the workflow for the user;
- provide instructions about the workflow to the user device to cause the user to perform the workflow via the user device;
- cause the user device to perform a function based on the key performance indicator;
- cause the user device to implement the decision;
- cause the enterprise system to implement the decision; or
- retrain one or more of the context model, the intelligent automation model, or the insights model based on the data identifying one or more of the workflow, the key performance indicator, or the decision.

16. The non-transitory computer-readable medium of claim 14, wherein the one or more instructions, that cause the device to process the subject and the context for the subject, with the intelligent automation model, to determine the workflow for the user, cause the device to:
- identify events based on the subject and the context for the subject;
- determine the workflow based on the events; and
- generate a notification for the workflow or instructions to perform workflow.

17. The non-transitory computer-readable medium of claim 14, wherein the one or more instructions, that cause the device to process the product/service data, the subject, and the context for the subject, with the insights model, to determine the key performance indicator or the decision, cause the device to:
- convert the product/service data into a format compatible with the insights model and to generate formatted product/service data; and
- process the formatted product/service data, the subject, and the context for the subject, with the insights model, to determine the key performance indicator or the decision.

18. The non-transitory computer-readable medium of claim 14, wherein the one or more instructions, that cause the device to process the query and the product/service data, with the context model, to identify the subject and the context for the subject, cause the device to:
- perform natural language processing of the query to identify the subject;
- identify the user of the user device based on user credentials; and
- identify the context for the subject based on identifying the user.

19. The method of claim 1, wherein the role information includes information identifying one or more of:
- a title,
- a purpose,
- an objective,
- a responsibility, or
- a computing resource that the user is prohibited from accessing.

20. The non-transitory computer-readable medium of claim 14, wherein the role information includes information identifying one or more of:
- a title,
- a purpose,
- an objective,
- a responsibility, or
- a computing resource that the user is prohibited from accessing.

* * * * *